(12) United States Patent
Tsumagari et al.

(10) Patent No.: US 9,746,175 B2
(45) Date of Patent: Aug. 29, 2017

(54) BURNER

(71) Applicants: HINO MOTORS, LTD., Tokyo (JP); SANGO CO., LTD., Aichi-ken (JP)

(72) Inventors: Ichiro Tsumagari, Hino (JP); Ryo Shibuya, Hino (JP); Atsushi Koide, Miyoshi (JP)

(73) Assignee: HINO MOTORS, LTD., Tokyo (JP)

( * ) Notice: Subject to any disclaimer, the term of this patent is extended or adjusted under 35 U.S.C. 154(b) by 0 days.

(21) Appl. No.: 14/419,521

(22) PCT Filed: Aug. 7, 2013

(86) PCT No.: PCT/JP2013/071428
§ 371 (c)(1),
(2) Date: Feb. 4, 2015

(87) PCT Pub. No.: WO2014/024942
PCT Pub. Date: Feb. 13, 2014

(65) Prior Publication Data
US 2015/0211734 A1    Jul. 30, 2015

(30) Foreign Application Priority Data

Aug. 7, 2012   (JP) .................................. 2012-174930
Aug. 30, 2012  (JP) .................................. 2012-190080

(51) Int. Cl.
F23D 11/00   (2006.01)
F23D 11/40   (2006.01)
(Continued)

(52) U.S. Cl.
CPC .......... *F23D 11/406* (2013.01); *B01F 5/0065* (2013.01); *B01F 5/0268* (2013.01);
(Continued)

(58) Field of Classification Search
CPC .... F01N 3/0253; F01N 3/2033; F23D 11/002; F23D 11/406
(Continued)

(56) References Cited

U.S. PATENT DOCUMENTS 1,848,990 A     3/1932  Boyd et al.
2,181,261 A  *  11/1939  Breese ...................... F23D 5/00
                                                       138/45
(Continued)

FOREIGN PATENT DOCUMENTS

CN        85200213 U    9/1985
CN        2238967 Y    10/1996
(Continued)

OTHER PUBLICATIONS

Partial Search Report for European Patent Application No. 13828740.4, dated Jun. 29, 2015, 7 pages.
(Continued)

*Primary Examiner* — Avinash Savani
*Assistant Examiner* — Deepak Deean
(74) *Attorney, Agent, or Firm* — Sheridan Ross PC

(57) ABSTRACT

A burner includes a first tube portion formed with an ejection port; a second tube portion that extends in the first tube portion toward the ejection port and to which gaseous mixture flows in from a side opposite to the ejection port; a third tube portion arranged in the first tube portion and including an open end positioned on the ejection port side; a closing portion that closes the open end; a coupling wall portion that closes a gap between the first tube portion and the second tube portion; a partition wall that is coupled to the first tube portion and the third tube portion, the partition wall being formed with a communication path; and an igniting portion that is arranged on the ejection port side with respect to the partition wall.

12 Claims, 7 Drawing Sheets

(51) Int. Cl.

| | |
|---|---|
| *F23D 11/44* | (2006.01) |
| *F23G 7/06* | (2006.01) |
| *B01F 5/00* | (2006.01) |
| *B01F 5/02* | (2006.01) |
| *B01F 5/04* | (2006.01) |
| *F01N 3/20* | (2006.01) |
| *F01N 3/025* | (2006.01) |
| *F23C 3/00* | (2006.01) |

(52) U.S. Cl.
CPC .......... *B01F 5/0451* (2013.01); *F01N 3/0253* (2013.01); *F01N 3/2033* (2013.01); *F23C 3/006* (2013.01); *F23D 11/002* (2013.01); *F23D 11/402* (2013.01); *F23D 11/408* (2013.01); *F23D 11/443* (2013.01); *F23G 7/065* (2013.01); *F23G 7/066* (2013.01); *F01N 2240/14* (2013.01); *F23C 2900/03005* (2013.01); *F23C 2900/06041* (2013.01); *F23D 2900/11402* (2013.01); *F23D 2900/11403* (2013.01); *Y02T 10/26* (2013.01)

(58) Field of Classification Search
USPC .......................................................... 431/354
See application file for complete search history.

(56) References Cited

U.S. PATENT DOCUMENTS

| | | | |
|---|---|---|---|
| 2,304,706 A | 12/1942 | Pollock | |
| 2,458,066 A | 1/1949 | Farkas et al. | |
| 2,806,517 A * | 9/1957 | Te Nuyl | F23C 3/00 110/260 |
| 2,918,117 A * | 12/1959 | Griffin | F23C 9/006 431/116 |
| 2,946,651 A * | 7/1960 | Houdry | B01D 53/944 126/91 A |
| 3,083,525 A | 4/1963 | Morris | |
| 3,285,316 A | 11/1966 | Gustafson et al. | |
| 3,311,456 A * | 3/1967 | Denny | F23G 7/066 110/212 |
| 3,523,770 A | 8/1970 | Rahm | |
| 3,711,243 A * | 1/1973 | Zink | F23D 11/002 431/181 |
| 3,733,169 A | 5/1973 | Lefebvre | |
| 3,787,169 A | 1/1974 | Gjerde | |
| 4,004,875 A * | 1/1977 | Zink | F23C 7/00 431/116 |
| 4,030,875 A | 6/1977 | Grondahl et al. | |
| 4,130,388 A * | 12/1978 | Flanagan | F23C 9/00 431/10 |
| 4,392,813 A * | 7/1983 | Tanaka | F23N 5/006 431/201 |
| 4,538,413 A * | 9/1985 | Shinzawa | F01N 3/0256 431/248 |
| 4,543,055 A * | 9/1985 | Tilly | F23N 1/002 431/12 |
| 4,565,380 A | 1/1986 | Newman et al. | |
| 4,716,725 A | 1/1988 | Dettling et al. | |
| 4,952,218 A | 8/1990 | Lipp et al. | |
| 4,982,570 A | 1/1991 | Waslo et al. | |
| 4,987,738 A | 1/1991 | Lopez-Crevillen et al. | |
| 5,105,621 A | 4/1992 | Simmons et al. | |
| 5,140,814 A | 8/1992 | Kreutmair et al. | |
| 5,216,885 A | 6/1993 | Taniguchi et al. | |
| 5,293,743 A | 3/1994 | Useleman et al. | |
| 5,320,523 A | 6/1994 | Stark | |
| 5,339,630 A | 8/1994 | Pettit | |
| 5,370,526 A | 12/1994 | Buschulte et al. | |
| 5,450,869 A | 9/1995 | Brittain et al. | |
| 5,826,428 A | 10/1998 | Blaschke | |
| 5,975,887 A | 11/1999 | Kamal | |
| 5,993,197 A * | 11/1999 | Alber | F23D 3/40 29/890.02 |
| 6,102,687 A | 8/2000 | Butcher et al. | |
| 6,131,960 A | 10/2000 | McHughs | |
| 6,238,206 B1 | 5/2001 | Cummings, III et al. | |
| 6,540,505 B1* | 4/2003 | Wuest | F23D 11/406 431/207 |
| 7,685,811 B2 | 3/2010 | Taylor et al. | |
| 7,980,069 B2 | 7/2011 | Arellano et al. | |
| 9,027,332 B2 | 5/2015 | Olivier | |
| 2002/0136997 A1* | 9/2002 | Wolf | F23M 9/06 431/258 |
| 2003/0022123 A1* | 1/2003 | Wolf | F23D 11/103 431/354 |
| 2003/0079467 A1* | 5/2003 | Liu | B01D 53/9431 60/286 |
| 2005/0150215 A1 | 7/2005 | Taylor et al. | |
| 2006/0130469 A1 | 6/2006 | Baeuerle et al. | |
| 2008/0307780 A1* | 12/2008 | Iverson | F01N 3/025 60/311 |
| 2009/0158720 A1 | 6/2009 | Krause et al. | |
| 2011/0061369 A1 | 3/2011 | Yetkin et al. | |
| 2012/0322012 A1 | 12/2012 | Tsumagari et al. | |

FOREIGN PATENT DOCUMENTS

| | | |
|---|---|---|
| CN | 1040861 | 3/1999 |
| CN | 1441198 A | 9/2003 |
| CN | 102159890 | 8/2011 |
| CN | 202024329 U | 11/2011 |
| DE | 4440716 | 7/1996 |
| EP | 0031279 A1 | 7/1981 |
| EP | 2075426 | 7/2009 |
| FR | 2438234 | 4/1980 |
| FR | 2540974 A1 | 8/1984 |
| GB | 2035538 | 6/1980 |
| JP | 58160726 A | 9/1983 |
| JP | 5954707 U | 4/1984 |
| JP | 5993913 A | 5/1984 |
| JP | 6058810 U | 4/1985 |
| JP | 60162213 U | 10/1985 |
| JP | 6129010 U | 2/1986 |
| JP | 61280305 A | 12/1986 |
| JP | 4350315 A | 12/1992 |
| JP | 684118 U | 12/1994 |
| JP | 200349636 A | 2/2003 |
| JP | 200941852 A | 2/2009 |
| JP | 2011157824 A | 8/2011 |
| JP | 2011185493 A | 9/2011 |
| WO | WO2011/034884 A1 | 3/2011 |

OTHER PUBLICATIONS

Partial Search Report for European Patent Application No. 13828197.7, dated Jun. 26, 2015, 7 pages.
Official Action for Australia Patent Application No. 2013300488, mailed Mar. 3, 2015, 3 pages.
International Search Report prepared by the Japanese Patent Office on Sep. 4, 2013, for International Application No. PCT/JP2013/071428.
Official Action for U.S. Appl. No. 14/420,945, mailed May 18, 2016 15 pages.
Official Action for European Patent Application No. 13828197.7, dated Oct. 11, 2016, 5 pages.
Official Action for European Patent Application No. 13827901.3, dated Apr. 26, 2017, 8 pages.

* cited by examiner

Fig.12(a) Fig.12(b) Fig.12(c)

BURNER

CROSS REFERENCE TO RELATED APPLICATIONS

This application is a national stage application under 35 U.S.C. 371 and claims the benefit of PCT Application No. PCT/JP2013/071428 having an international filing date of Aug. 7, 2013, which designated the United States, which PCT application claimed the benefit of Japanese Patent Application No. 2012-174930 filed Aug. 7, 2012, and Japanese Patent Application No. 2012-190080 filed Aug. 30, 2012, the disclosures of each of which are incorporated herein by reference.

TECHNICAL FIELD

The technique of the present disclosure relates to burners for raising the temperature of the exhaust gas, and in particular, to a premixing type burner in which a gaseous mixture of fuel and air is supplied to a combustion chamber.

BACKGROUND ART

A known diesel particulate filter (DPF) is arranged in an exhaust passage of a diesel engine to capture particulate matters (PM) contained in the exhaust gas. In such DPF, a regeneration process of incinerating the particular matters captured by the DPF using the exhaust gas is carried out to maintain the capturing function of the particulate matters.

For example, in an exhaust gas purifying device of patent document 1, a burner is arranged at a pre-stage of the DPF, and a combustion gas is generated in the combustion chamber of the burner. The temperature of the exhaust gas that will flow into the DPF is raised by supplying the combustion gas to the exhaust gas in the exhaust passage.

A burner of premixing type that supplies the gaseous mixture of fuel and air to the combustion chamber without individually supplying the fuel and the air to the combustion chamber to enhance the ignitability and the combustibility of the gaseous mixture and to reduce the unburned fuel contained in the combustion gas is known for such burner.

PRIOR ART DOCUMENT

Patent Document

Patent document 1: Japanese Laid-Open Patent Publication No. 2011-185493

SUMMARY OF THE INVENTION

The combustion gas generated by the burner of premixing type mentioned above contains unburned fuel in no small part. Such fuel is not used for the power of the engine, and thus the fuel used for raising the temperature of the exhaust gas is preferably small in terms of suppressing the fuel consumption amount of the vehicle mounted with the engine. It is therefore desired to reduce the unburned gas at the time of combustion such that the fuel required in obtaining a predetermined burner output is reduced.

It is an object of the technique of the present disclosure to provide a burner of premixing type capable of reducing the unburned fuel in the combustion gas.

One aspect of a burner in the present disclosure includes: a first tube portion having a tube end including an ejection port that ejects a combustion gas in which gaseous mixture is combusted; a second tube portion extending in the first tube portion toward the ejection port, the gaseous mixture flowing into the second tube portion from a side opposite to the ejection port; a third tube portion arranged in the first tube portion, the second tube portion is internally inserted into the third tube portion, the third tube portion including an open end positioned on the ejection port side; a closing portion that closes the open end; a first wall portion that is coupled to an inner side surface of the first tube portion and an outer side surface of the second tube portion to close a gap between the first tube portion and the second tube portion; a second wall portion coupled to the inner side surface of the first tube portion and an outer side surface of the third tube portion, the second wall portion having a communication path that communicates a side opposite to the ejection port with respect to the wall portion with the ejection port side; and an igniting portion that is arranged on the ejection port side with respect to the second wall portion and that ignites the gaseous mixture.

According to one aspect of the burner in the present disclosure, the gaseous mixture flows through the second tube portion toward an ejection port and is then turned back to flow through a gap between the second tube portion and the third tube portion toward the side opposite to the ejection port. The gaseous mixture is again turned back to flow through a gap between the third tube portion and the first tube portion toward the ejection port, and then passed through a communication path formed in the second wall portion, and then ignited by an igniting portion. In other words, the premixing chamber and the combustion chamber are partitioned by the second wall portion.

According to such configuration, the mixing of the fuel and the air in the premixing chamber is promoted since the flow path of the gaseous mixture is long compared to when the flow path of the gaseous mixture is not turned back. Furthermore, flame is suppressed from being propagated to the gaseous mixture in the premixing chamber since the flow rate of the gaseous mixture that flows into the combustion chamber is increased by the second wall portion. Thus, the combustion gas generated from the gaseous mixture that passed through the premixing chamber is generated under high probability compared to when the second wall portion is not arranged.

The third wall portion is heated by the combustion gas generated in the combustion chamber. Thus, the gaseous mixture flowing through the gap between the second tube portion and the third portion is heated by the combustion gas through the third tube portion. As a result, the temperature of the gaseous mixture is raised compared to when the gaseous mixture is not heated in the premixing chamber.

In other words, according to the configuration described above, the combustibility of the gaseous mixture is improved since the mixing of the gaseous mixture in the premixing chamber is promoted and the temperature of the gaseous mixture is raised, whereby the unburned fuel contained in the combustion gas is reduced.

In another aspect of the burner according to the present disclosure: the first tube portion includes an extended part extending toward the side opposite to the ejection port from a coupling portion of the first tube portion with the first wall portion; fuel and air are supplied to a space surrounded by the extended part; and the extended part has first introduction ports that introduce air into the extended part and swirling flow generating portions that generate a swirling flow of the air in the extended part.

According to another aspect of the burner in the present disclosure, a swirling flow of air is generated by the swirling flow generating portions in the extended part. The gaseous mixture is generated when fuel is supplied to such air, and such gaseous mixture flows into the second tube portion. Therefore, the mixing of the fuel and the air in the premixing chamber is promoted compared to when the swirling flow of air is not generated in the extended part.

In another aspect of the burner according to the present disclosure, the first tube portion includes: first introduction ports that introduce the air into an extended part extending toward the side opposite to the ejection port from the coupling portion of the first tube portion with the first wall portion; and second introduction ports that are positioned in a region of the ejection port side with respect to the igniting portion, wherein the second introduction ports introduce air to a gap between the first tube portion and the third tube portion.

According to another aspect of the burner in the present disclosure, fresh air is supplied to the burning gaseous mixture through the second introduction ports. Thus, the mixing of the unburned gaseous mixture and the burning gaseous mixture, and the mixing of the unburned gaseous mixture itself are promoted. As a result, the combustibility of the gaseous mixture is improved compared to when the fresh air is not supplied to the burning gaseous mixture.

Another aspect of the burner according to the present disclosure further includes: a fourth tube portion arranged so that the first tube portion is internally inserted, the fourth tube portion having an end on the ejection port side that closes a gap with the first tube portion; and an air supplying passage that is connected to a region on the ejection port side of the fourth tube portion and that supplies air to a gap between the first tube portion and the fourth tube portion.

According to another aspect of the burner in the present disclosure, the first tube portion is heated by the combustion gas generated in the combustion chamber. The non-mixed air that flows through the gap between the first tube portion and the fourth tube portion is thus heated by the combustion gas through the first tube portion. As a result, since the temperature of the gaseous mixture is raised, the combustibility of the gaseous mixture is further improved compared to when the non-mixed air is not heated.

Furthermore, since the burner uses exhaust heat of the combustion gas, the combustibility of the gaseous mixture is improved and the heat damage on other configuring elements at the periphery of the burner is suppressed with a simple configuration compared to when a means for heating the non-mixed air is arranged besides.

Another aspect of the burner according to the present disclosure further includes a guiding portion that guides the air so that the air from the air supplying passage swirls around the first tube portion.

According to another aspect of the burner in the present disclosure, the air flowing through the gap between the first tube portion and the fourth tube portion flows toward a side opposite to the ejection port while swirling around the first tube portion. Thus, the flow path of when the air flows through the gap between the first tube portion and the fourth tube portion becomes long compared to when the guiding portion is not formed, whereby the heating of air through the first tube portion is efficiently carried out. Consequently, the temperature of the gaseous mixture is further raised, and the combustibility of the gaseous mixture is further improved.

In another aspect of the burner according to the present disclosure, an internal space of the first tube portion is partitioned to a premixing chamber and a combustion chamber by the third tube portion, the closing portion, and the second wall portion, and the closing portion includes a circulating flow generating portion having: a surface that collides with a flow of the combustion gas from the igniting portion side toward the ejection port to generate a circulating flow in a part of the flow, the circulating flow circulating between an upstream side and a downstream side; and a region exposed to a pre-mixed gaseous mixture in the premixing chamber.

According to another aspect of the burner in the present disclosure, the circulating flow generating portion generates a circulating flow in which the gas circulates in the combustion chamber, so that the time in which the unburned fuel stagnates in the combustion chamber becomes long and the unburned fuel is thus taken into the flame and easily combusted. The circulating flow circulates between the upstream side and the downstream side in at least a part of the flow from the igniting portion side toward the ejection port, and thus the concentration distribution of the unburned fuel becomes evenly distributed in the up and down direction of the flow. Furthermore, the circulating flow generating portion contacts with the circulating flow, which is generated by the circulating flow generating portion in the combustion chamber, and thus the amount of heat absorbed from the combustion gas in the combustion chamber increases compared to when the circulating flow generating portion contacts with a laminar flow, for example. Therefore, the heat is propagated to the pre-mixed gaseous mixture, so that liquefaction of the vaporizing fuel contained in the pre-mixed gaseous mixture can be suppressed and the vaporization of the liquid fuel can be promoted.

In another aspect of the burner according to the present disclosure: the closing portion includes a closing plate that closes the open end of the third tube portion; the circulating flow generating portion includes a baffle plate arranged on the ejection port side with respect to the closing plate, the combustion gas from the igniting portion side toward the ejection port colliding the baffle plate; and a first circulating flow generating space is arranged between the baffle plate and the closing plate in the combustion chamber to generate a circulating flow on an upstream side of the baffle plate, and a second circulating flow generating space is arranged on a downstream side of the baffle plate in the combustion chamber.

According to another aspect of the burner in the present disclosure, the circulating flow generating space is arranged on the upstream side and the downstream side of a baffle plate. Thus, the opportunity the unburned fuel is taken into the flame and combusted increases and the baffle plate makes contact with the circulating flow at the upper and lower surfaces thereof, whereby the amount of heat absorbed from the combustion gas can be further increased.

In another aspect of the burner according to the present disclosure, the circulating flow generating portion includes a heat transmitting portion having an elongated shape inserted in the premixing chamber.

According to another aspect of the burner in the present disclosure, a heat transmitting portion having an elongated shape is inserted in the premixing chamber, so that liquefaction of the vaporizing fuel is suppressed and vaporization of the liquid fuel is promoted in the premixing chamber.

In another aspect of the burner according to the present disclosure, the circulating flow generating portion includes a baffle plate that closes the open end of the third tube portion, the baffle plate having a portion that projects out from an outer side surface of the third tube portion.

According to another aspect of the burner in the present disclosure, the circulating flow generating portion includes the baffle plate that projects out from an outer side surface of the third tube portion, and thus the circulating flow can be generated at the downstream side thereof. The baffle plate partitions the premixing chamber, whereby the propagation path of heat from the combustion chamber to the premixing chamber becomes short and the amount of heat loss lost before heating the pre-mixed gaseous mixture can be reduced.

In another aspect of the burner according to the present disclosure, a narrow portion is arranged between the baffle plate and the first tube portion.

According to another aspect of the burner in the present disclosure, the combustion gas and the pre-mixed gaseous mixture flow into the back side of the baffle plate through the narrow portion, and the pressure at the downstream side of the baffle plate is reduced and the diffusion of the unburned fuel can be promoted.

In another aspect of the burner according to the present disclosure, an outer diameter of the baffle plate has a ratio of greater than or equal to 0.6 and smaller than or equal to 0.8 with respect to an inner diameter of the first tube portion.

According to another aspect of the burner in the present disclosure, the outer diameter of the baffle plate has a ratio in the above range with respect to the inner diameter of the first tube portion, and thus the upstream pressure of the baffle plate can be appropriately adjusted and the mixing efficiency can be improved to reduce the discharge amount of unburned fuel from the burner.

In another aspect of the burner according to the present disclosure: the first tube portion includes an extended part extending toward the side opposite to the ejection port with respect to a coupling portion of the first tube portion with the first wall portion; fuel and air are supplied to a space surrounded by the extended part; the extended part has first introduction ports that introduce air into the extended part and swirling flow generating portions that generate a swirling flow of the air in the extended part; and the swirling flow generating portions swirl the air in a direction different from the circulating direction of the combustion gas by the circulating flow generating portion.

According to another aspect of the burner in the present disclosure, the circulating flow generating portion generates the circulating flow that circulates up and down in a flowing direction from the igniting portion side toward the ejection port, whereas the swirling flow generating portions generate the swirling flow that swirls in a direction different from the circulating flow. Thus, the concentration distribution of the unburned fuel becomes evenly distributed in a plurality of directions in the burner.

BRIEF DESCRIPTION OF THE DRAWINGS

FIG. 12 is a variant of a circulating flow generating portion of the burner according to the present disclosure, where (a) and (b) are cross-sectional views and (c) is a side view of the main parts.

DETAILED DESCRIPTION OF THE PREFERRED EMBODIMENTS

First Embodiment

A first embodiment embodying a burner according to the present disclosure will be hereinafter described with reference to FIG. 1 to FIG. 6.

Figure 1:
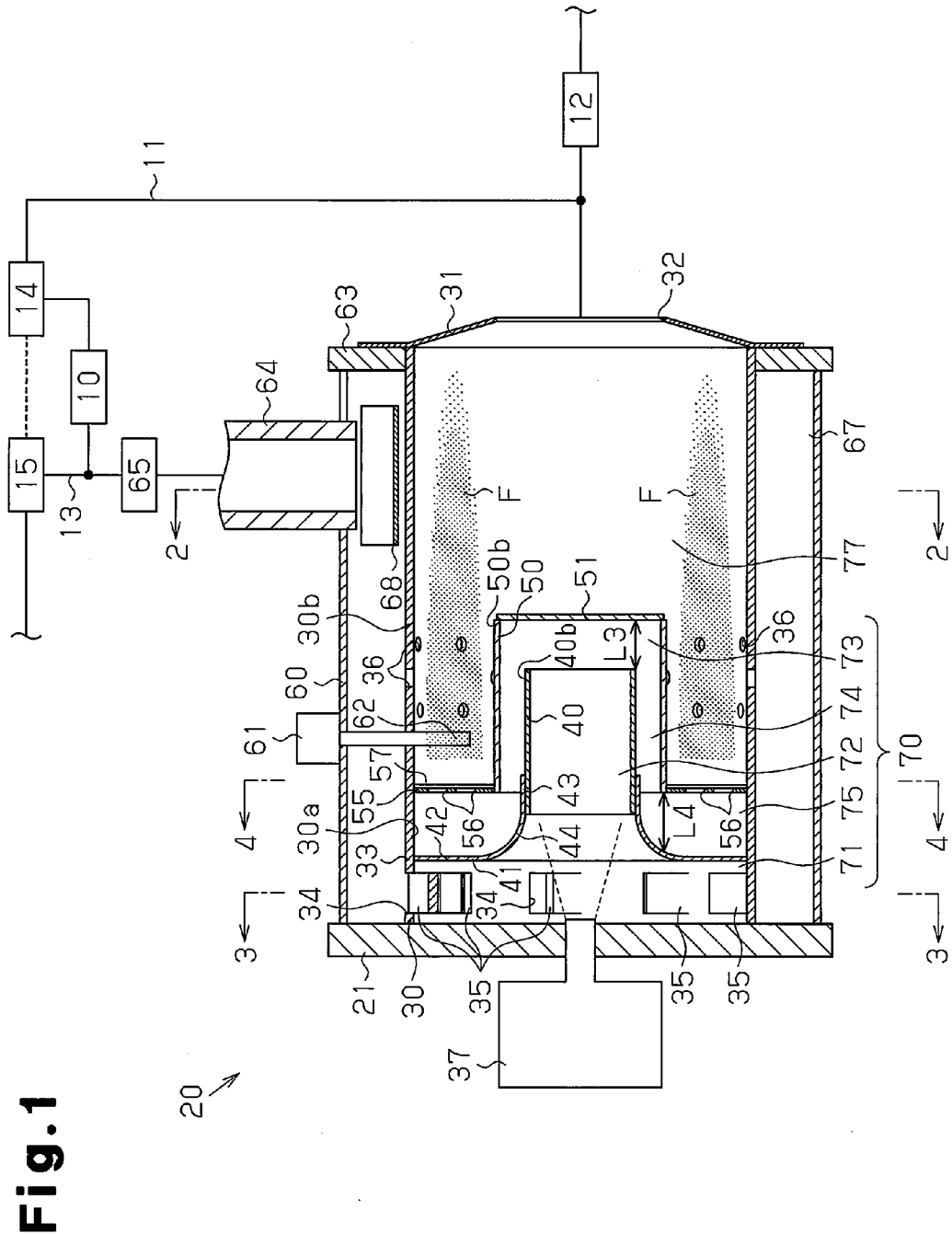
FIG. 1 is a schematic configuration diagram showing a schematic configuration of a first embodiment embodying a burner according to the present disclosure.

As shown in FIG. 1, a diesel particulate filter 12 (hereinafter referred to as DPF 12) that captures particulate matters contained in exhaust gas is mounted on an exhaust passage 11 of a diesel engine 10 (hereinafter simply referred to as engine 10).

The DPF 12 configuring an exhaust gas purifying device has a honeycomb structure made of porous silicon carbide, for example, and captures the particulate matters in the exhaust gas at the inner wall surface of a columnar body configuring the honeycomb structure. A burner 20 is mounted at a pre-stage of the DPF 12 to execute a regeneration process of the DPF 12 by raising the temperature of the exhaust gas that flows into the DPF 12.

A cylindrical first tube portion 30 (hereinafter simply referred to as tube portion 30) is fixed to a substrate 21 of the burner 20 so that an opening on a basal end side is closed by the substrate 21. At a distal end of the tube portion 30, an ejection port 32 is formed by an annular ejection plate 31 fixed to the distal end. A cylindrical second tube portion 40 (hereinafter simply referred to as tube portion 40) is joined with an inner side surface 30a of the tube portion 30 by way of an annular coupling wall portion 41, which is a first wall portion. The coupling wall portion 41 has an outer peripheral edge fixed at a position closer to the substrate 21 of the tube portion 30, and closes a gap between the inner side surface 30a of the tube portion 30 and an outer side surface 40b of the tube portion 40. The coupling wall portion 41 includes a collar part 42 coupled to the inner side surface 30a of the tube portion 30, a tubular internal inserting part 43, to which the tube portion 40 is coupled with the tube portion 40 internally inserted, and a diameter reduced part 44 which connects the collar part 42 and the internal inserting part 43; the diameter reduced part 44 in which the closer to the tube portion 40 it is, the closer toward the ejection port side 32 it is formed. The tube portion 40 is extended toward the ejection port 32 from a coupling portion with respect to the coupling wall portion 41 and has an opening on the ejection port 32 side opened.

The tube portion 30 includes an extended part 33 that extends toward the substrate 21 side relative to the coupling portion of the tube portion 30 with the coupling wall portion 41. The extended part 33 is provided with a first introduction port 34 (hereinafter simply referred to as introduction port 34) at a predetermined interval in the circumferential direction to introduce a combustion air into a first mixing chamber 71 (hereinafter simply referred to as mixing chamber 71), which is a space surrounded by the extended part 33. The extended part 33 is also provided with a cut-and-raised piece 35 in which a part of a peripheral wall of the extended part 33 is cut and raised toward the inner side from an opening edge of the introduction port 34. The tube portion 30 is provided with a plurality of second introduction ports 36 (hereinafter simply referred to as introduction port 36) on the ejection port 32 side with respect to an igniting portion 62 to introduce the combustion air into a combustion chamber 77, to be described later.

A fuel supplying unit 37 for supplying fuel to the mixing chamber 71 is fixed to the substrate 21. The fuel supplying unit 37 has a distal end where a supply port is formed. The distal end is arranged in the mixing chamber 71. The fuel supplying unit 37 is connected to a fuel pump for supplying fuel to an engine (not shown) and a fuel valve (not shown), and supplies vaporized fuel to the mixing chamber 71. The air and the fuel introduced to the mixing chamber 71 flow into a second mixing chamber 72 (hereinafter simply referred to as mixing chamber 72), which is a space surrounded by the tube portion 40 and the coupling wall portion 41, from a side opposite to the ejection port 32.

A cylindrical third tube portion 50 (hereinafter simply referred to as tube portion 50), in which a part of the tube portion 40 is internally inserted, projects out toward the ejection port 32 side with respect to the tube portion 40, where an opening of the projected portion is closed by a closing plate 52 serving as a closing portion. In the tube portion 50, a tube end on a side opposite to the ejection port 32 is arranged on the ejection port 32 side with respect to the coupling wall portion 41, and this tube end is fixed to the tube portion 30 by way of an annular partition wall 55.

The partition wall 55, which is a second wall portion, has an inner circumferential edge coupled over the entire circumference of an outer side surface 50b of the tube portion 50, and has an outer circumferential edge coupled over the entire circumference of the inner side surface 30a of the tube portion 30. The partition wall 55 is provided with a plurality of communication paths 56, each making the ejection port 32 side communicate with a side opposite to the ejection port 32 with respect to the partition wall 55. Furthermore, a metallic mesh 57 that covers the plurality of communication paths 56 at the ejection port 32 side is attached to the partition wall 55.

A third mixing chamber 73 (hereinafter simply referred to as mixing chamber 73), which is a space surrounded by the tube portion 50 and the closing plate 51 and which communicates with the mixing chamber 72, is provided on the ejection port 32 side with respect to the tube portion 40. A fourth mixing chamber 74 (hereinafter simply referred to as mixing chamber 74), which communicates with the mixing chamber 73 by a gap between the tube portion 40 and the tube portion 50, is also provided. A fifth mixing chamber 75 (hereinafter simply referred to as mixing chamber 75), which is a space surrounded by the tube portion 30, the partition wall 55, and the coupling wall portion 41 and which communicates with the mixing chamber 74, is provided on a side opposite to the ejection port 32 with respect to the mixing chamber 74.

The mixing chambers 72, 73, 74, 75 are set to have different flow path cross-sectional areas with respect to each other. The flow path cross-sectional area of the mixing chamber 72 is based on the inner diameter of the tube portion 40. The mixing chamber 74 is set to have a flow path cross-sectional area greater than the mixing chamber 72. The flow path cross-sectional area of the mixing chamber 73 is based on a distance in an axial direction of the tube portion 40, the distance being a distance L3 between the tube end of the tube portion 40 and the closing plate 51. The flow path cross-sectional area of the mixing chamber 75 is based on a distance in an axial direction of the tube portion 50, the distance being a distance L4 between the tube end of the tube portion 50 and the coupling wall portion 41.

The igniting portion 62 of an ignition plug 61 is arranged on the ejection port 32 side with respect to the partition wall 55. The ignition plug 61 is fixed to a cylindrical fourth tube portion 60 (hereinafter simply referred to as tube portion 60), to which the tube portion 50 is internally inserted. The igniting portion 62 is arranged on the ejection port 32 side with respect to the partition wall 55 through a through-hole formed in the tube portion 50 and the tube portion 60.

In other words, in the burner 20, a premixing chamber 70 is comprised of the mixing chambers 71, 72, 73, 74, 75 described above. The combustion chamber 77 is comprised of the gap between the tube portion 30 and the tube portion 50, and the space located at the ejection port 32 side with respect to the closing plate 51 and surrounded by the tube portion 30. The premixing chamber 70 and the combustion chamber 77 are partitioned by the partition wall 55.

The gaseous mixture in the premixing chamber 70 flows through the mixing chamber 72 toward the ejection port 32, and is then turned in the mixing chamber 73 to flow through the mixing chamber 74 toward a direction opposite to the mixing chamber 72. Thereafter, the gaseous mixture is again turned in the mixing chamber 75 to flow into the combustion chamber 77 through the communication path 56 of the partition wall 55. When the gaseous mixture that flowed into the combustion chamber 77 is ignited by the igniting portion 62, flame F, which is the burning gaseous mixture, is generated and the combustion gas accompanying the flame F is generated in the combustion chamber 77.

The tube portion 60, in which the tube portion 30 is internally inserted, is fixed to the substrate 21. The tube portion 60 has an opening, which is closed by the substrate 21 on a side opposite to the ejection port 32. At a tube end on the ejection port 32 side of the tube portion 60, a gap between the tube portion 60 and the tube portion 50 is closed by an annular closing plate 63.

A downstream end of an air supplying passage 64 is connected to the tube portion 60 at an end on the side of the ejection port 32. An upstream end of the air supplying passage 64 is connected to a downstream of a compressor 15, which rotates with a turbine 14 arranged on the exhaust passage 11, on an intake passage 13 of the engine 10.

An air valve 65 capable of changing the flow path cross-sectional area of the air supplying passage 64 is arranged on the air supplying passage 64. The air valve 65 is open/close controlled by a control unit (not shown). In other words, when the air valve 65 is in an open state, a part of an intake air flowing through the intake passage 13 flows in as the combustion air through the air supplying passage 64 to an air flowing chamber 67, which is a gap between the tube portion 30 and the tube portion 60. The combustion air is supplied to the combustion chamber 77 through the plurality of introduction ports 36 making the air flowing chamber 67 communicate with the combustion chamber 77, and is also introduced to the mixing chamber 71 through the plurality of introduction ports 34 making the air flowing chamber 67 communicate with the mixing chamber 71.

Figure 2:
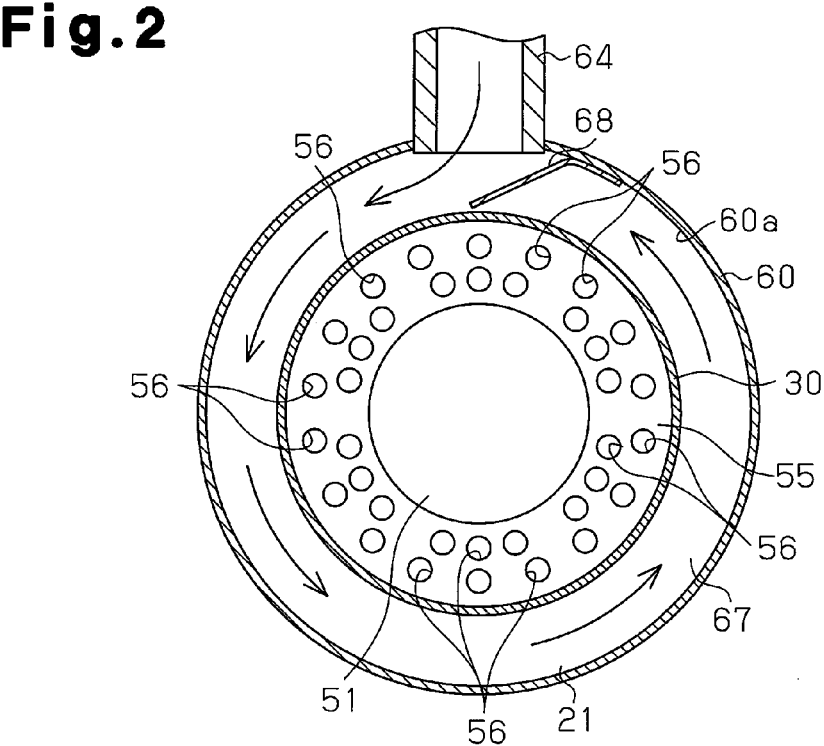
FIG. 2 is a cross-sectional view showing a cross-sectional structure taken along line 2-2 in FIG. 1.

FIG. 2 is a cross-sectional view showing a cross-sectional structure taken along line 2-2 in FIG. 1, and is a view in which the metallic mesh 57 is omitted. The arrow shown in FIG. 2 indicates a rough flow of the combustion air. As also shown in FIG. 2, a guiding portion 68 that guides the combustion air such that the combustion air flowing through the air flowing chamber 67 becomes a swirling flow that swirls around the tube portion 50 is arranged near the exit of the air supplying passage 64. The guiding portion 68 has a plate shape that is fixed to an inner side surface 60a of the tube portion 60 and arranged to cover the exit of the air supplying passage 64. The guiding portion 68 is bent from a fixed portion with respect to the tube portion 60 and inclined to make the distal end side approach the tube portion 30. The combustion air flowing out from the air supplying passage 64 impinges on the guiding portion 68, thus being guided by the guiding portion 68. The swirling flow of the combustion air swirling around the tube portion 50 is thereby formed in the air flowing chamber 67.

Figure 3:
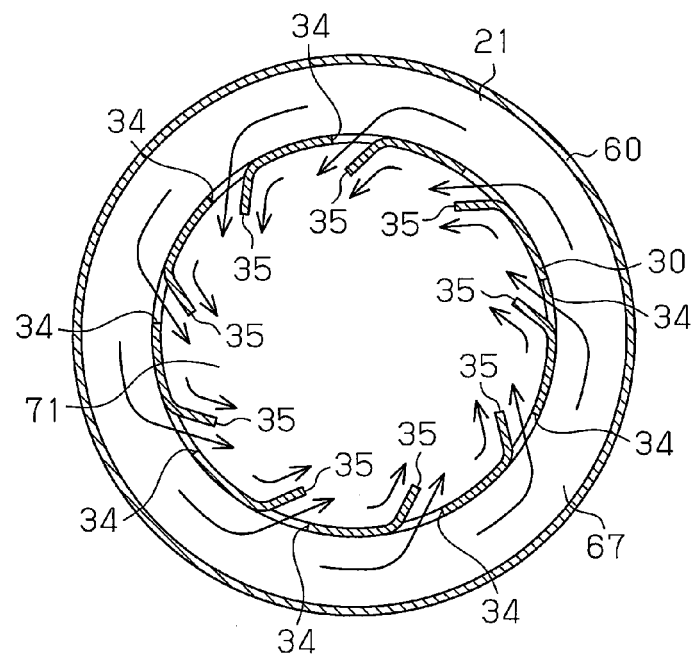
FIG. 3 is a cross-sectional view showing a cross-sectional structure taken along line 3-3 in FIG. 1.

FIG. 3 is a cross-sectional view showing a cross-sectional structure taken along line 3-3 in FIG. 1, where the arrow shown in FIG. 3 indicates a rough flow of the combustion air. As shown in FIG. 3, the cut-and-raised piece 35 formed in the extended part 33 of the tube portion 30 is arranged to cover the introduction port 34. The cut-and-raised piece 35 generates the swirling flow of the combustion air in the mixing chamber 71 by guiding the combustion air flowing into the mixing chamber 71 through the introduction port 34. In the first embodiment, the guiding portion 68 and the cut-and-raised piece 35 are formed such that the swirling flows of the combustion air generated in the air flowing chamber 67 and the mixing chamber 71 are in the same direction.

Figure 4:
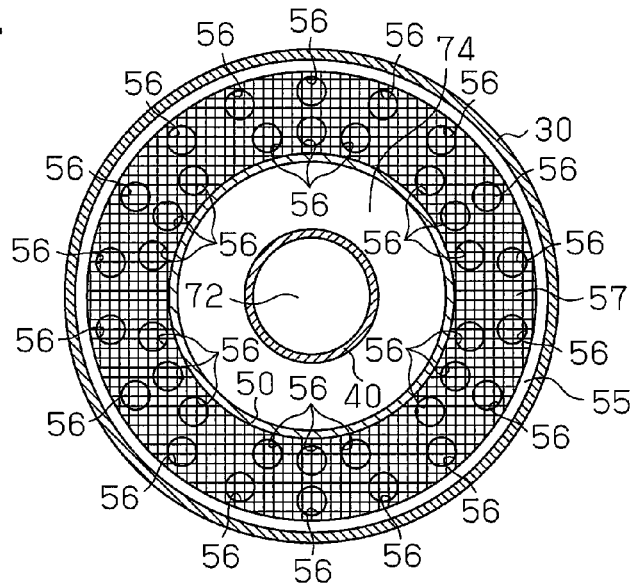
FIG. 4 is a cross-sectional view showing a cross-sectional structure taken along line 4-4 in FIG. 1.

Furthermore, as shown in FIG. 4, the partition wall 55 is formed with the plurality of communication paths 56 in a region of the partition wall 55 excluding a margin for coupling the partition wall 55 to the tube portion 30, a margin for coupling the partition wall 55 to the tube portion 50, and a margin for attaching the metallic mesh 57 to the partition wall 55. The communication paths 56 are arrayed such that the center of the opening is arranged on two concentric circles having different diameters from each other. In the first embodiment, 18 communication paths 56 are arrayed on each concentric circle, where the communication paths 56 arrayed on the concentric circle having a large diameter are arrayed such that the interval of the communication paths 56 adjacent to each other is equal. The communication paths 56 arrayed on the concentric circle having a small diameter are arrayed such that the interval of the communication paths 56 adjacent to each other becomes as equal as possible while taking into consideration the margins described above.

A total opening area of the communication path 56 is set such that the flow rate of the gaseous mixture flowing into the combustion chamber 77 becomes higher than a propagation speed of the flame F based on the result of simulation, in which various information such as fuel supply amount, introduction amount of combustion air, opening area and arrangement of the array of the introduction ports 36, and the like, for example, are assumed as parameters. A flame length Lf, which is the length of the flame F, can be adjusted by the number of communication paths 56. Thus, the number of communication paths 56 is set in view of the flame length Lf, which is the length of the flame F, such that the size of the burner 20 corresponds to a required specification while ensuring the combustion chamber 77 of a size sufficient to combust the gaseous mixture.

The fuel supply amount is the amount of fuel based on the temperature of the DPF 12 and the target temperature as well as the exhaust gas temperature and the exhaust gas flow volume in the exhaust passage 11, and is the amount necessary for raising the temperature of the DPF 12 to the target temperature by raising the temperature of the exhaust gas flowing into the DPF 12. The combustion air amount is the amount of air based on the fuel supply amount, and is the amount of air necessary for combusting the fuel for the amount of fuel supply amount.

The operation of the burner 20 configured as above will now be described with reference to FIG. 5 and FIG. 6.

When the regeneration process of the DPF 12 is started, the air valve 65 is controlled to the open state, and the fuel supplying unit 37 and the igniting portion 62 are driven. When the air valve 65 is in the open state, a part of the intake air flowing through the intake passage 13 flows into the air flowing chamber 67 as the combustion air. The combustion air flows toward the side opposite to the ejection port 32 while swirling around the tube portion 30 by being guided by the guiding portion 68.

A part of the combustion air flowing through the air flowing chamber 67 is introduced to the combustion chamber 77 through the introduction port 36, and the remaining part is introduced to the mixing chamber 71 through the introduction port 34. Since a direction of the swirling flow guided by the guiding portion 68 and a direction of the swirling flow generated by the cut-and-raised piece 35 are the same, the swirl guided by the guiding portion 68 is not weakened, but the combustion air introduced to the mixing chamber 71 generates the swirling flow of which the swirl is strengthened by the guiding portion 68.

The cut-and-raised piece 35 is cut and raised toward the inner side of the tube portion 30. Thus, as shown in FIG. 3 as well, in the combustion air that flows in through the introduction port 34, the combustion air flowing along the inner side surface of the tube portion 30 is guided to an inner region of the tube portion 30, that is, a region to which the fuel is supplied from the fuel supplying unit 37 by the cut-and-raised piece 35 arranged on the downstream of the swirling direction with respect to the introduction port 34. In the mixing chamber 71, the fuel is supplied from the fuel supplying unit 37 to the combustion air in the swirling state thus generating the gaseous mixture. The gaseous mixture then flows into the mixing chamber 72. In this case, the gaseous mixture flows into the mixing chamber 72 while maintaining the swirling state since the flow path cross-sectional area is gradually reduced by the diameter reduced part 44 of the coupling wall portion 41.

Therefore, the fuel is supplied to the combustion air in the swirling state in the mixing chamber 71, and the gaseous mixture is flowed toward the ejection port 32 while maintaining the swirling state in the mixing chamber 72. Thus, in the mixing chambers 71, 72, the mixing of fuel and combustion air is promoted compared to a case in which the fuel is supplied to the combustion air in a non-swirling state in the mixing chamber 71 or a case in which the swirling state of the gaseous mixture is not maintained in the mixing chamber 72.

The swirling flow is also generated by the cut-and-raised piece 35 in which a part of the circumferential wall of the tube portion 30 is cut and raised in the mixing chamber 71. Thus, in terms of generating the swirling flow of the combustion air in the mixing chamber 71, the mixing chamber 71 is easily manufactured compared to when separately fixing a piece of the same shape as the cut-and-raised piece 35 to the tube portion 30.

The gaseous mixture flowing through the mixing chamber 72 toward the ejection port 32 is then turned in the mixing chamber 73 to flow through the mixing chamber 74 in a direction opposite to the mixing chamber 72. The gaseous mixture is again turned in the mixing chamber 75, and flows into the combustion chamber 77 through the communication paths 56 of the partition wall 55.

In such premixing chamber 70, compared to the premixing chamber in which the gaseous mixture is not turned, the mixing of the gaseous mixture is promoted as the flow path of the gaseous mixture becomes long by the mixing chambers 73, 74, 75. Furthermore, the mixing of the gaseous mixture based on ungradual change in the flow path cross-sectional area is also promoted since the mixing chambers 72, 73, 74, 75 are set to have flow path cross-sectional areas different from each other.

When the gaseous mixture that flows into the combustion chamber 77 is ignited by the igniting portion 62, the flame F, which is the burning gaseous mixture, is generated and the combustion gas accompanying the flame F is generated in the combustion chamber 77. The combustion air is supplied to the flame F from the introduction port 36 formed in the tube portion 30. Thus, the mixing of the unburned gaseous mixture and the burning gaseous mixture, and the mixing of the unburned gaseous mixture itself are promoted compared to when new combustion air is not supplied to the flame F.

The combustion gas generated in the combustion chamber 77 is supplied to the exhaust passage 11 through the ejection port 32 and mixed with the exhaust gas in the exhaust passage 11 to raise the temperature of the exhaust gas flowing into the DPF 12. In the DPF 12 to which the exhaust gas flows in, the temperature is raised up to the target temperature thus incinerating the particulate matters captured by the DPF 12.

When the combustion gas is generated in the combustion chamber 77, the tube portions 30, 50 providing the combustion chamber 77 are heated by the combustion gas. Thus, the combustion air flowing through the air flowing chamber 67 after the generation of the combustion gas is heated by the combustion gas through the tube portion 30. According to such heating, the combustion air of higher temperature than when the combustion air is not heated is thus introduced to the mixing chamber 71. Thus, the liquefaction of the already vaporized fuel is suppressed and the vaporization of the fuel that is not vaporized in the fuel supplying unit 37 is promoted by the generation of the gaseous mixture by such combustion air. Furthermore, the combustion air flowing through the air flowing chamber 67 swirls around the tube portion 50 by the guiding portion 68. Thus, the flowing path in the air flowing chamber 67 becomes long compared to the combustion air flowing through the air flowing chamber 67 without swirling, whereby the combustion air of higher temperature is introduced to the mixing chamber 71.

Moreover, the gaseous mixture flowing through the mixing chamber 74 after the generation of the combustion gas is heated by the combustion gas through the tube portion 50. The temperature of the gaseous mixture is thus raised, whereby the liquefaction of the already vaporized fuel is suppressed and the vaporization of the non-vaporized fuel is promoted in the mixing chamber 74 as well.

When the combustion gas is generated by the combustion chamber 77 in such manner, the vaporization of the fuel is promoted thus improving the combustibility of the gaseous mixture. Furthermore, the heating of the combustion air and the gaseous mixture is carried out using the exhaust heat of the combustion gas. Thus, the combustibility of the gaseous mixture is improved and the heat damage on other configuring elements at the periphery of the burner 20 is also suppressed with a simple configuration compared to a configuration in which a heating unit for heating the combustion air and the gaseous mixture is arranged besides.

In the burner 20, while a part of the heat of the combustion gas is absorbed by the combustion air and the gaseous mixture, the unburned fuel is reduced. Thus, under the assumption that the same amount of fuel is supplied to the combustion chamber 77, the burner output equal to or greater than when the combustion air and the gaseous mixture are not heated is maintained.

As described above, the opening area and the number of the communication paths 56 are set such that the flow rate of the gaseous mixture flowing into the combustion chamber 77 becomes higher than the propagation speed of the flame F. However, a region where the flow rate is smaller than the propagation speed of the flame F may locally form in the gaseous mixture passing through the communication path 56. If the flame F is propagated to the premixing chamber 70 through such region, the gaseous mixture may be combusted before the mixing and the heating of the gaseous mixture in the premixing chamber 70 are completed.

With regards to such aspect, the metallic mesh 57 that covers the openings of all the communication paths 56 is attached to the surface on the ejection port 32 side of the partition wall 55. With the attachment of the metallic mesh 57 to the partition wall 55, the flame F is suppressed from being propagated to the premixing chamber 70 by the flame stabilizing effect of the metallic mesh 57.

As the plurality of communication paths 56 are arranged in the partition wall 55, the flame length Lf, which is the length of the flame F, can be adjusted by changing the arrangement of the array, the size of the opening area, and the shape of the communication path 56. As a result, the flexibility related to the size of the burner 20 increases, whereby the burner 20 can be miniaturized according to the required specification.

Figure 5:
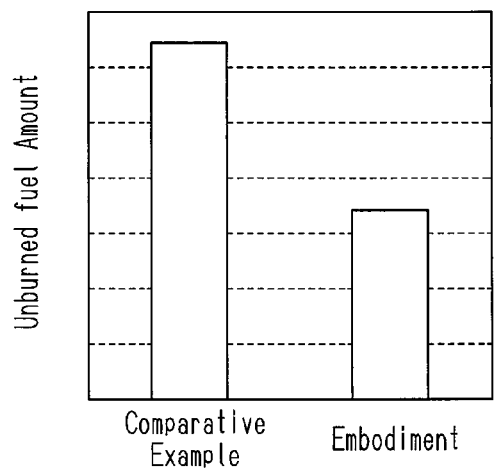
FIG. 5 is a graph showing one example of a result of comparing an unburned fuel amount at a downstream side of the burner in the first embodiment.

FIG. 5 is a graph showing an example of the result of an experiment in which the unburned fuel amount at the downstream side of the burner is compared. In the burner of the comparative example, the tube portion 40 and the coupling wall portion 41 are omitted from the burner 20, and the partition wall 55 is a closed wall that is not formed with the communication paths 56. A communication path communicating to the combustion chamber 77 is arranged in plurals at an end on the ejection port 32 side of the tube portion 50, with the interior of the tube portion 50 as the premixing chamber. In other words, the burner of the comparative example has a structure in which the mixing chambers 73, 74, 75 are not arranged. As shown in FIG. 5, it is confirmed that the unburned fuel amount on the downstream side of the burner is less in the burner 20 of the example than in the burner of the comparative example.

Figure 6:
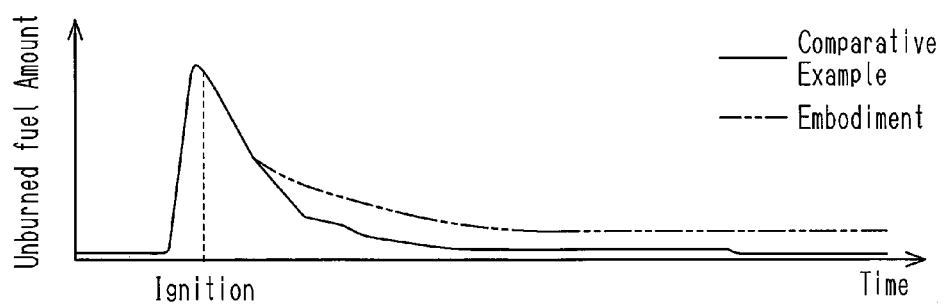
FIG. 6 is a graph showing one example of a result of comparing the unburned fuel amount at the downstream side of the burner in the first embodiment.

FIG. 6 is a graph showing an example of the result of an experiment in which the transition of the unburned fuel amount before and after the ignition on the downstream side of the burner is compared, where the example, which is the burner 20 described above, is shown with a solid line and the comparative example, which is the burner of the comparative example, is shown with a two dotted line. In the burner of the comparative example, a structure in which the combustion air is introduced to the mixing chamber 71 without being heated by the tube portion 50 is adopted.

As shown in FIG. 6, although there is no great difference in the amount of unburned fuel until the combustion gas is generated, it is confirmed that the unburned fuel amount is less in the burner 20 of the example than in the burner of the comparative example after the generation of the combustion gas. In other words, it is confirmed that the combustibility of the gaseous mixture is improved by heating the combustion air.

As described above, the burner 20 according to the first embodiment has effects (advantages) listed below.

(1) In the premixing chamber 70 of the burner 20, the flow path of the gaseous mixture is turned back. Thus, the flow path of the gaseous mixture in the premixing chamber 70 becomes long compared to the burner including the premixing chamber without such turning back of the flow path. As a result, the mixing of the gaseous mixture is promoted thus improving the combustibility of the gaseous mixture, whereby the unburned fuel contained in the combustion gas is reduced.

(2) In the burner 20, the gaseous mixture flowing through the mixing chamber 74 is heated by the combustion gas through the tube portion 50. Thus, the temperature of the gaseous mixture is raised compared to when the heating of the gaseous mixture by the combustion gas is not carried out. As a result, the vaporization of the fuel in the gaseous mixture is promoted thus improving the combustibility of the gaseous mixture, whereby the unburned fuel contained in the combustion gas is reduced.

(3) In the mixing chamber 71, the fuel is supplied to the combustion air that is in the swirling state. As a result, the mixing of the fuel and the combustion air is promoted compared to when the fuel is supplied to the combustion air that is not in the swirling state.

(4) The combustion air is supplied to the combustion gas through the introduction port 36 of the tube portion 30. Thus, the mixing of the unburned gaseous mixture and the burning gaseous mixture, as well as the mixing of the fuel in the unburned gaseous mixture itself and the combustion air are promoted compared to when a new combustion air is not supplied to the burning gaseous mixture.

(5) The combustion air is heated by the combustion gas through the tube portion 30. As a result, the temperature of the combustion air introduced to the mixing chamber 71 is raised compared to when the combustion air is not heated.

(6) The exhaust heat of the combustion gas is used for the heating of the combustion air and the gaseous mixture. As a result, a configuration for heating the combustion air and the gaseous mixture is simplified compared to when the heating unit for heating the combustion air is arranged besides.

(7) Since the heat radiation to the periphery of the burner 20 is suppressed, the heat damage on other configuring elements at the periphery of the burner 20 is suppressed.

(8) The combustion air flowing through the air flowing chamber 67 swirls around the tube portion 50 by being guided by the guiding portion 68. Thus, the flowing path of the combustion air in the air flowing chamber 67 becomes long compared to when the combustion air is not swirled in the air flowing chamber 67, whereby the combustion air is heated to a higher temperature.

(9) The swirling flow of the combustion air is formed by the cut-and-raised piece 35 in the mixing chamber 71. As a result, the mixing of the combustion air and the fuel in the mixing chamber 71 is promoted.

(10) The swirling direction by the cut-and-raised piece 35 and the swirling direction by the guiding portion 68 are the same. Thus, the combustion air smoothly flows into the mixing chamber 71 compared to when the swirling direction by the cut-and-raised piece 35 and the swirling direction by the guiding portion 68 are different from each other.

(11) The cut-and-raised piece 35 is cut and raised toward the inner side of the tube portion 30. Thus, the combustion air is easily supplied to the region where the fuel is supplied from the fuel supplying unit 37 compared to when the cut-and-raised piece is cut and raised toward the outer side of the tube portion 30.

(12) The cut-and-raised piece 35 is obtained by cutting and raising a part of the peripheral wall of the extended part 33. Thus, in terms of generating the swirling flow of the combustion air in the mixing chamber 71, it is easily formed the piece for generating the swirling flow on the extended part 33 compared to when separately fixing a piece of the same shape as the cut-and-raised piece 35 to the extended part 33.

(13) The mixing of the gaseous mixture caused by the pressure change in the premixing chamber 70 is promoted because the flow path cross-sectional areas in the mixing chamber 72, the mixing chamber 73, the mixing chamber 74, and the mixing chamber 75 are different from each other.

(14) The tube portion 50 has an end on the closing plate 51 side formed as a free end. Thus, even if the tube portion 50 is expanded by the heating of the combustion gas, the mechanical stress with respect to the tube portion 50 itself and the partition wall 55 is reduced.

The first embodiment may be appropriately changed and implemented as below.

The guiding portion for generating the swirling flow of the combustion air in the air flowing chamber 67 is not limited to being arranged to cover the exit of the air supplying passage 64, and may be a fin formed on the outer side surface 30b of the tube portion 30 or may be a fin formed on the inner side surface 60a of the tube portion 60.

The guiding portion for generating the swirling flow of the combustion air in the air flowing chamber 67 may be the air supplying passage 64 connected to the tube portion 60 at a position offset with respect to a center axis of the tube portion 60 in a plan view from a direction along the center axis of the tube portion 60.

The guiding portion for generating the swirling flow of the combustion air in the air flowing chamber 67 may be omitted. According to such configuration as well, the combustion air is heated by the combustion gas through the tube portion 30.

The burner may have a configuration in which the heating of the combustion air is not carried out. In other words, for example, a configuration in which the tube portion 60 is omitted, and the air supplying passage 64 is directly connected to a region where the tube portion surrounding only the extended part 33 of the tube portion 30 and the introduction port 36 are formed may be adopted in the burner 20.

The air supplying passage 64 may be connected to a portion of the tube portion 60 other than the end on the ejection port 32 side such as the central part of the tube portion 60, and the like. Furthermore, the air supplying passage 64 may be arranged in plurals.

In the burner 20, the introduction port 36 for introducing the combustion air to the combustion chamber 77 may have the size of the opening area and the array appropriately changed according to the required specification and application, or may be omitted.

The cut-and-raised piece may be cut and raised toward the outer side of the tube portion 30. With such configuration as well, the swirling flow of the combustion air is generated in the mixing chamber 71.

The cut-and-raised piece toward the outer side of the tube portion 30 and the cut-and-raised piece toward the inner side of the tube portion 30 may be formed in the tube portion 30.

The swirling flow by the guiding portion 68 and the swirling flow by the cut-and-raised piece 35 may be in directions different from each other.

The swirling flow generating portion for generating the swirling flow of the combustion air in the mixing chamber 71 is not limited to the cut-and-raised piece 35 obtained by cutting and raising a part of the circumferential wall of the tube portion 30, and may be obtained by joining a member that covers the opening of the introduction port 34 to the tube portion 30 like the guiding portion 68.

The swirling flow generating portion for generating the swirling flow of the combustion air in the mixing chamber 71 may be the air supplying passage 64 connected to the tube portion 30 at the position offset with respect to the center axis of the tube portion 30 in a plan view from the direction along the center axis of the tube portion 30.

The mixing chamber 71 may have a configuration in which the swirling flow generating portion for generating the swirling flow of the combustion air is omitted.

The arrangement of the array, the opening area, and the shape of the communication path 56 in the partition wall 55 can be appropriately changed by various types of simulations and experiments related to the unburned fuel and the flame length.

The metallic mesh 57 attached to the partition wall 55 is not limited to covering the plurality of communication paths 56 from the ejection port 32 side, and may cover the plurality of communication paths 56 from the substrate 21 side or from both the ejection port 32 side and the substrate 21 side. According to such configuration as well, the flame F is suppressed from being propagated to the premixing chamber 70 by the flame stabilizing effect of the metallic mesh 57 by attaching the metallic mesh 57 to the partition wall 55.

The closing plate 51 that closes the opening of the tube portion 50 may close the opening of the tube portion 40 on the ejection port 32 side if a through-hole communicating the mixing chamber 72 and the mixing chamber 74 is formed in the circumferential wall of the tube portion 40. Under such configuration, the flow path cross-sectional area of the through-hole is preferably such that the flow path cross-sectional area in the mixing chamber 72 and the flow path cross-sectional area in the mixing chamber 74 are different from each other.

A configuration of heating the combustion air flowing through the air supplying passage 64 may be added to the burner 20. For example, the peripheral wall of the air supplying passage 64 and the peripheral wall of the exhaust passage 11 may be shared, and the heating heater or the burner for heating the combustion air may be added. According to such configuration, the temperature of the combustion air can be raised without generating the combustion gas, and the combustion air can be heated to a higher temperature than when the combustion air is heated with only the tube portion 30.

At least a set of flow path cross-sectional areas of the mixing chambers 72, 73, 74, 75 may be the same.

The end on the closing plate 51 side of the tube portion 50 heated by the combustion gas may be a fixed end fixed to the tube portion 30, for example.

Each tube portion merely needs to have a tubular shape, and may have a shape in which the inner diameter of each tube portion is changed in the axial direction of the tube portion, or an elliptical tube shape or a polygonal tube shape.

In the burner 20, the gaseous mixture needs to flow into the tube portion 40 from the side opposite to the ejection port 32. Thus, for example, a first inner side tube portion to be internally inserted to the tube portion 40, a coupling wall portion for closing the gap between the first inner side tube portion and the coupling wall portion 41, and a second inner side tube portion, which is fixed to the tube portion 40 with the first inner side tube portion internally inserted thereto and has the opening on the ejection port 32 side closed, may be added to the burner 20. According to such configuration, the flowing path of the gaseous mixture in the premixing chamber becomes longer, whereby the mixing of the gaseous mixture is further promoted.

The fuel supplying unit 37 is not limited to supplying vaporized fuel to the mixing chamber 71, and may spray atomized fuel.

The fuel sprayed from the fuel supplying unit 37 may be supplied not from the fuel pump but from a common rail. Furthermore, a fuel pump for supplying the fuel only to the fuel supplying unit 37 may be mounted.

The igniting portion may have a configuration in which a glow heater, a laser ignition device, and a plasma ignition device are appropriately mounted in addition to the ignition plug. As long as the flame F can be generated, only one of the glow heater, the laser ignition device, and the plasma ignition device may be mounted.

The combustion air is not limited to the intake air flowing through the intake passage 13 and may be the air flowing through piping connected to the air tank of the brake or the air supplied by a blower for the burner.

The exhaust gas purifying device is not limited to the DPF 12, and may include a catalyst for purifying the exhaust gas. According to such configuration, the temperature of the catalyst can be raised quickly to the activation temperature because the temperature of the catalyst is raised by the burner 20.

The engine on which the burner is mounted may be a gasoline engine.

Second Embodiment

Figure 8:
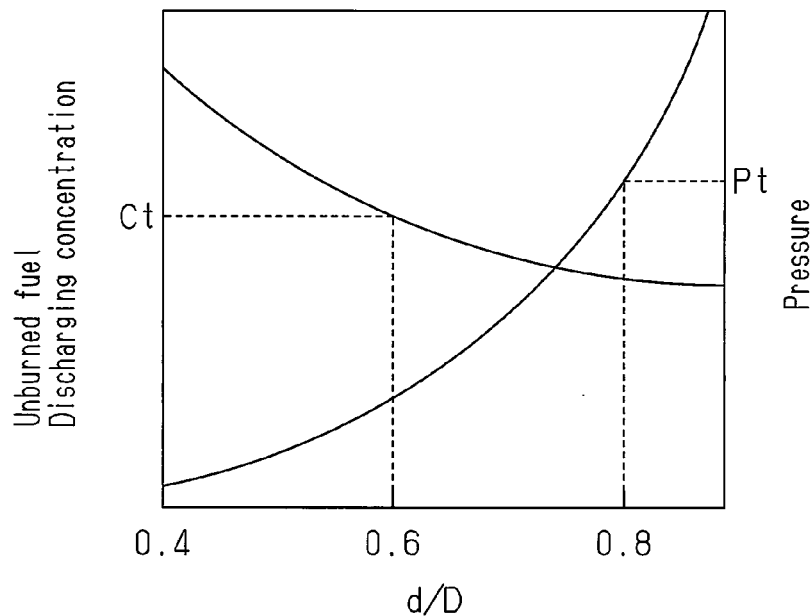
FIG. 8 is a graph showing a relationship of a ratio of an outer diameter of a baffle plate with respect to an inner diameter of a first tube portion and an unburned fuel discharging concentration in a burner of the second embodiment.
Figure 9:
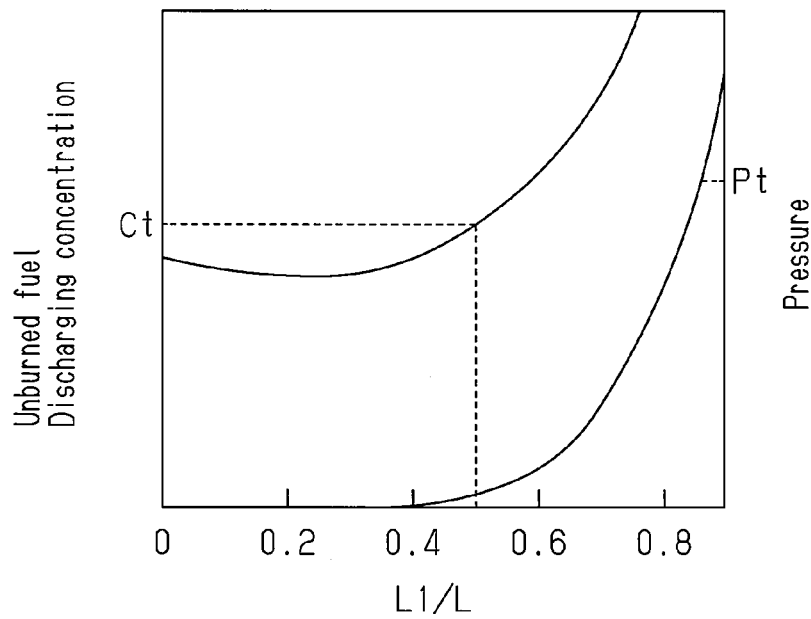
FIG. 9 is a graph showing a relationship of a ratio of a length of a first circulating flow generating space with respect to a length of two circulating flow generating spaces and the unburned fuel discharging concentration in the burner of the second embodiment.

A second embodiment embodying the burner according to the present disclosure will now be described with reference to FIG. 7 to FIG. 9. The burner of the second embodiment has the same main configuration as the burner according to the first embodiment. Thus, in the second embodiment, the portion different from the first embodiment will be described in detail, and the portion similar to the first embodiment is denoted with a similar reference number and the detailed description thereof will be omitted.

Figure 7:
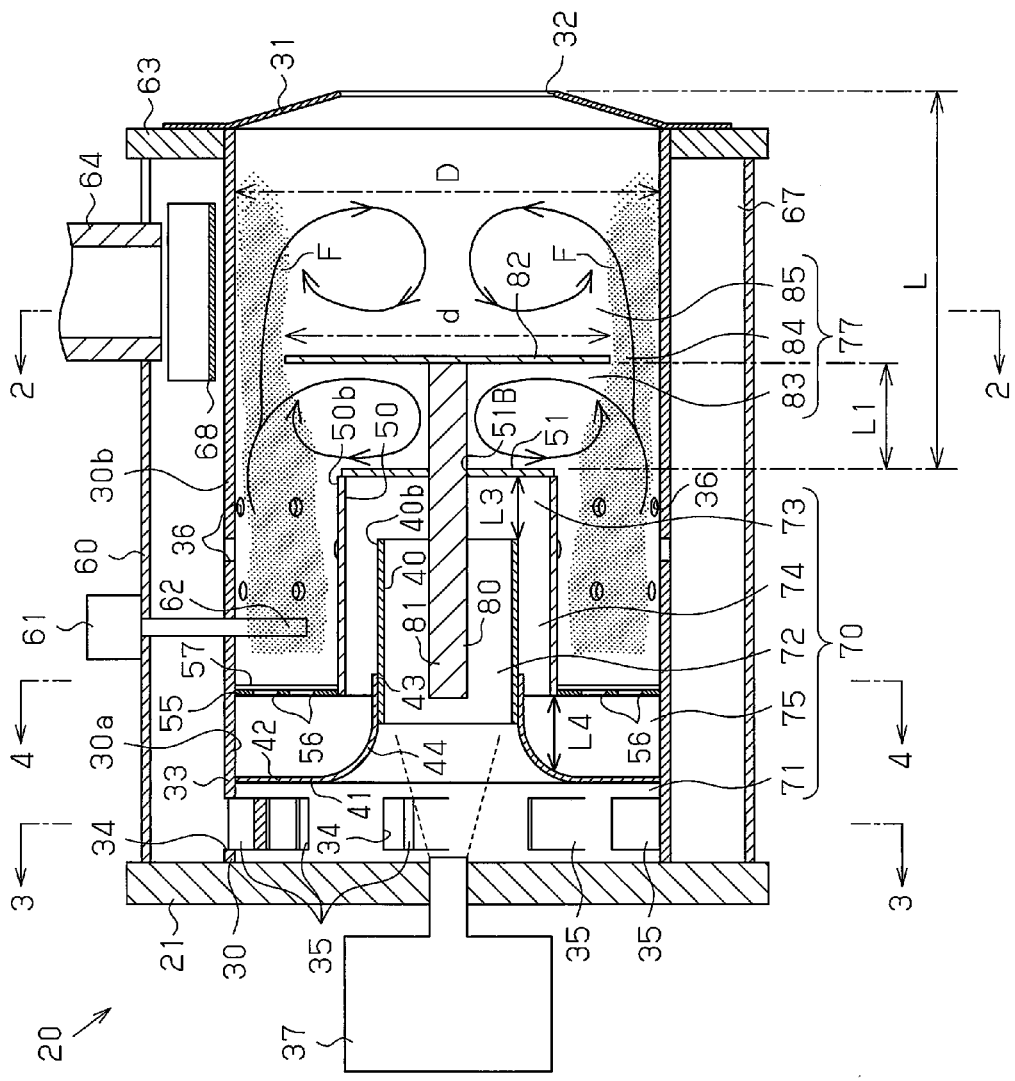
FIG. 7 is a schematic configuration diagram showing a schematic configuration of a second embodiment embodying the burner of the present disclosure.

As shown in FIG. 7, one circular insertion hole 51B is formed in the closing plate 51 of the third tube portion 50, and a baffle unit 80 serving as the circulating flow generating portion is fixed to the insertion hole 51B. The closing plate 51 and the baffle unit 80 configure a closing portion. The baffle unit 80 includes a long heat transmitting portion 81 and a baffle plate 82 joined to the distal end of the heat transmitting portion 81. The heat transmitting portion 81 has a rod-shape, and is inserted to the insertion hole 51B so that a substantially middle portion in the longitudinal direction is supported by the closing plate 51.

The baffle plate 82 is formed to a circular plate shape, where the diameter d is greater than the diameter of the tube portion 50 and smaller than the inner diameter D of the first tube portion 30. The heat transmitting portion 81 is extended perpendicular to the surface of the baffle plate 82 from the middle of the baffle plate 82. The baffle unit 80 is fixed such that the center axis of the heat transmitting portion 81 coincides with the center axis of the tube portion 50.

The baffle unit 80 is fixed to the tube portion 50 with the baffle plate 82 and the closing plate 51 spaced apart. As a result, the distal end of the heat transmitting portion 81 is inserted into the tube portion 50, and the basal end of the heat transmitting portion 81 is projected out from the tube portion 50. An annular first circulating flow generating space 83 that surrounds the basal end of the heat transmitting portion 81 is arranged between the baffle plate 82 and the closing plate 51.

A narrow portion 84 in which the flow path cross-sectional area is reduced is arranged between the baffle plate 82 and the inner side surface 30a of the tube portion 30. Furthermore, a second circulating flow generating space 85 is arranged between the baffle plate 82 and the ejection port 32. The entire space between the partition wall 55 and the ejection plate 31 including the narrow portion 84, the second circulating flow generating space 85 and the first circulating flow generating space 83 functions as the combustion chamber 77.

After the start of combustion, the remains of the pre-mixed gaseous mixture including the unburned fuel and the combustion gas generated by combusting the pre-mixed gaseous mixture coexist in the combustion chamber 77. Such gases flow toward the ejection port 32 from the igniting portion 62 side of the ignition plug 61, but some collides with the surface of the baffle plate 82 on the way. As a result, a circulating flow is generated in the first circulating flow generating space 83. The circulating flow rotates in a direction different from the swirling direction of the swirling flow in the premixing chamber 70 and circulates between the upstream side and the downstream side of the flow from the igniting portion 62 side toward the ejection port 32. In other words, the gases circulate in the up and down direction along the center axis of the tube portion 50. Therefore, the pre-mixed gaseous mixture, in which fuel concentration distribution already became evenly distributed in the radial direction in the premixing chamber 70, further has the fuel concentration distribution became evenly distributed in the up and down direction (direction along the center axis of the tube portion 50) of the tube portion 50 in the combustion chamber 77. When the circulating flow is generated, the term of the stagnation of the unburned fuel in the combustion chamber 77 becomes long, and the unburned fuel is taken into the flame F and easily combusted.

Furthermore, since a part of the flame F generated in the combustion chamber 77 makes contact with the baffle plate 82 and also flows to the narrow portion 84, disturbance occurs in the flame F thus increasing the flame area. The flame shape is influenced by the combustion air, the flow rate of the pre-mixed gaseous mixture, the fuel concentration, and the like, and the flame shape shown in FIG. 7 is merely an example.

The remains of the combustion gas and the pre-mixed gaseous mixture are accelerated and flow toward the back side of the baffle plate 82 by passing through the narrow portion 84. The pressure at the space on the downstream of the narrow portion 84 is reduced when the gas passes through the narrow portion 84. Furthermore, the gas that passed through the narrow portion 84 generates a circulating flow in the second circulating flow generating space 85, and diffuses in the entire second circulating flow generating space 85. The circulating flow circulates between the upstream side and the downstream side of the flow from the igniting portion 62 side toward the ejection port 32, similar to the circulating flow generated in the first circulating flow generating space 83. With the generation of such circulating flow, the remains of the pre-mixed gaseous mixture and the combustion gas are further mixed in the up and down direction along the center axis of the tube portion 50 immediately before being discharged from the ejection port 32, so that the opportunity the unburned fuel can be combusted is further increased.

The ratio (d/D) of the diameter d of the baffle plate 82 with respect to the inner diameter D of the tube portion 30 influences the mixing efficiency of the unburned fuel in the combustion chamber 77 and the pressure on the upstream side of the baffle plate 82, that is, the upstream pressure. In other words, as shown in FIG. 8, the ratio (d/D) is preferably set such that the upstream pressure is smaller than or equal to the target pressure Pt and the concentration of the unburned fuel (HC) discharged from the burner 20 becomes smaller than or equal to the target concentration Ct, and is to be set to greater than or equal to 0.6 and smaller than or equal to 0.8. If the ratio is smaller than 0.6, the narrow portion 84 becomes large, and the acceleration of the circulating flow at the second circulating flow generating space 85 becomes weak and the pressure reduction at the downstream of the narrow portion 84 becomes insufficient, whereby the gas is not sufficiently diffused. As a result, the concentration of the unburned fuel discharged becomes greater than the target concentration Ct. If the ratio (d/D) is greater than 0.8, the narrow portion 84 becomes small and the upstream pressure of the baffle plate 82 becomes greater than the target pressure Pt.

Similarly, as shown in FIG. 7, a ratio (L1/L) of the length L1 from the closing plate 51 to the baffle plate 82 with respect to the length L from the closing plate 51 to the ejection port 32 influences the diffusion efficiency at the downstream of the narrow portion 84 and the upstream pressure of the baffle plate 82. As shown in FIG. 9, the ratio (L1/L) is preferably set such that the upstream pressure becomes smaller than or equal to the target pressure Pt and the concentration of the unburned fuel (HC) discharged from the burner 20 becomes smaller than or equal to the target concentration Ct, and to this end, is to be set to smaller than or equal to 0.5. If the ratio is greater than 0.5, the upstream pressure becomes large and the concentration of the unburned fuel discharged becomes greater than the target concentration Ct. This is assumed to be because the mixing efficiency in the up and down direction along the center axis lowers if the first circulating flow generating space 83 is too long.

As shown in FIG. 7, the baffle plate 82 is heated by making contact with the flame F, which area is enlarged, after the start of combustion. One part exposed to the combustion chamber 77 of the baffle plate 82 and the heat transmitting portion 81 also makes contact with the combustion gas. In particular, the baffle plate 82 makes contact with the circulating flow generated at the front and rear of the plate, and hence the amount of heat absorbed from the combustion gas increases. As a result, the temperature of the pre-mixed gaseous mixture swirling in the tube portion 50 is raised by the heat propagated from the heat transmitting portion 81 inserted to the tube portion 50. Thus, the liquefaction of the already vaporized fuel is suppressed and the vaporization of the fuel of the already have liquefied is promoted.

As described above, the burner 20 according to the second embodiment has the following effects (advantages) in addition to the effects (advantages) described in (1) to (14) of the first embodiment.

(15) The burner 20 of the second embodiment includes the baffle unit 80 in the tube portion 30 provided with the combustion chamber 77. The baffle unit 80 has a surface that collides with a part of the flow from the igniting portion 62 side toward the ejection port 32, and generates a circulating flow that circulates between the upstream side and the downstream side of the flow. Therefore, the circulating flow in which the combustion gas and the pre-mixed gaseous mixture are circulated is generated on at least the downstream side of the baffle unit 80, so that the term in which the unburned fuel stagnates in the combustion chamber 77 becomes long, and the unburned fuel is taken into the flame F and easily combusted. According to the circulating flow, at least a part of the flow, which is flowing from the side of igniting portion 62 towards the ejection port 32, is circulating in the up and down direction, that is, in the direction along the center axis of the tube portion 50 in at least a part of the flow from the igniting portion 62 side toward the ejection port 32, and thus the concentration distribution of the unburned fuel becomes evenly distributed in the up and down direction of the flow, that is, the up and down direction along the center axis of the tube portion 30. Furthermore, the amount of heat absorbed from the combustion gas is increased more than when making contact with the laminar flow, for example, since the baffle unit 80 is making contact with the circulating flow. Thus, the liquefaction of the vaporizing fuel is suppressed and the vaporization of the liquid fuel is promoted by propagating the heat to the pre-mixed gaseous mixture.

(16) According to the second embodiment, the baffle unit 80 includes the baffle plate 82 to which the flow of gas from the igniting portion 62 toward the ejection port 32 collides. The first circulating flow generating space 83 is arranged between the baffle plate 82 and the closing plate 51, and the second circulating flow generating space 85 is arranged on the downstream of the baffle plate 82 in the combustion chamber 77. Thus, the opportunity the unburned fuel is taken into the flame F and combusted increases, and the baffle plate 82 makes contact with the circulating flow at both surfaces, whereby the amount of heat absorbed from the combustion gas is further increased.

(17) In the second embodiment, the baffle unit 80 includes the long heat transmitting portion 81 inserted to the second and third mixing chambers 72, 73. Thus, the liquefaction of the vaporizing fuel is suppressed and the vaporization of the liquid fuel is promoted in all of the entire second and third mixing chambers 72, 73.

(18) In the second embodiment, the narrow portion 84 is arranged between the baffle plate 82 and the tube portion 30. Therefore, the combustion gas and the pre-mixed gaseous mixture flow into the back side of the baffle plate 82 through the narrow portion 84, whereby the pressure at the downstream side of the baffle plate 82 is reduced and the diffusion of the unburned fuel is promoted.

(19) In the second embodiment, the diameter d of the baffle plate 82 has a ratio of greater than or equal to 0.6 and smaller than or equal to 0.8 with respect to the inner diameter D of the tube portion 30. Thus, the pressure on the upstream side of the baffle plate 82 is appropriately adjusted, and the mixing efficiency is improved to reduce the concentration of the unburned fuel discharged from the burner 20.

(20) In the second embodiment, the guiding plate 68 and the cut-and-raised piece 35 for generating the swirling flow are arranged on the upstream side of the baffle unit 80 in the burner 20. They generate the swirling flow in which the combustion air rotates in a different direction with respect to the circulating direction of the circulating flow generated by the baffle unit 80. Thus, the pre-mixed gaseous mixture is mixed not only in the up and down direction along the center axis of the tube portion 30 but also in the radial direction of the tube portion 30, so that the concentration distribution of the unburned fuel becomes evenly distributed not only in the up and down direction but also in the radial direction of the combustion chamber 77.

Third Embodiment

A third embodiment embodying the burner according to the present disclosure will be hereinafter described with reference to FIG. 10. The burner of the third embodiment has the same main configuration as the burner according to the first embodiment. Thus, in the third embodiment, the portion different from the first embodiment will be described in detail, and the portion similar to the first embodiment is denoted with a similar reference number and the detailed description thereof will be omitted.

Figure 10:
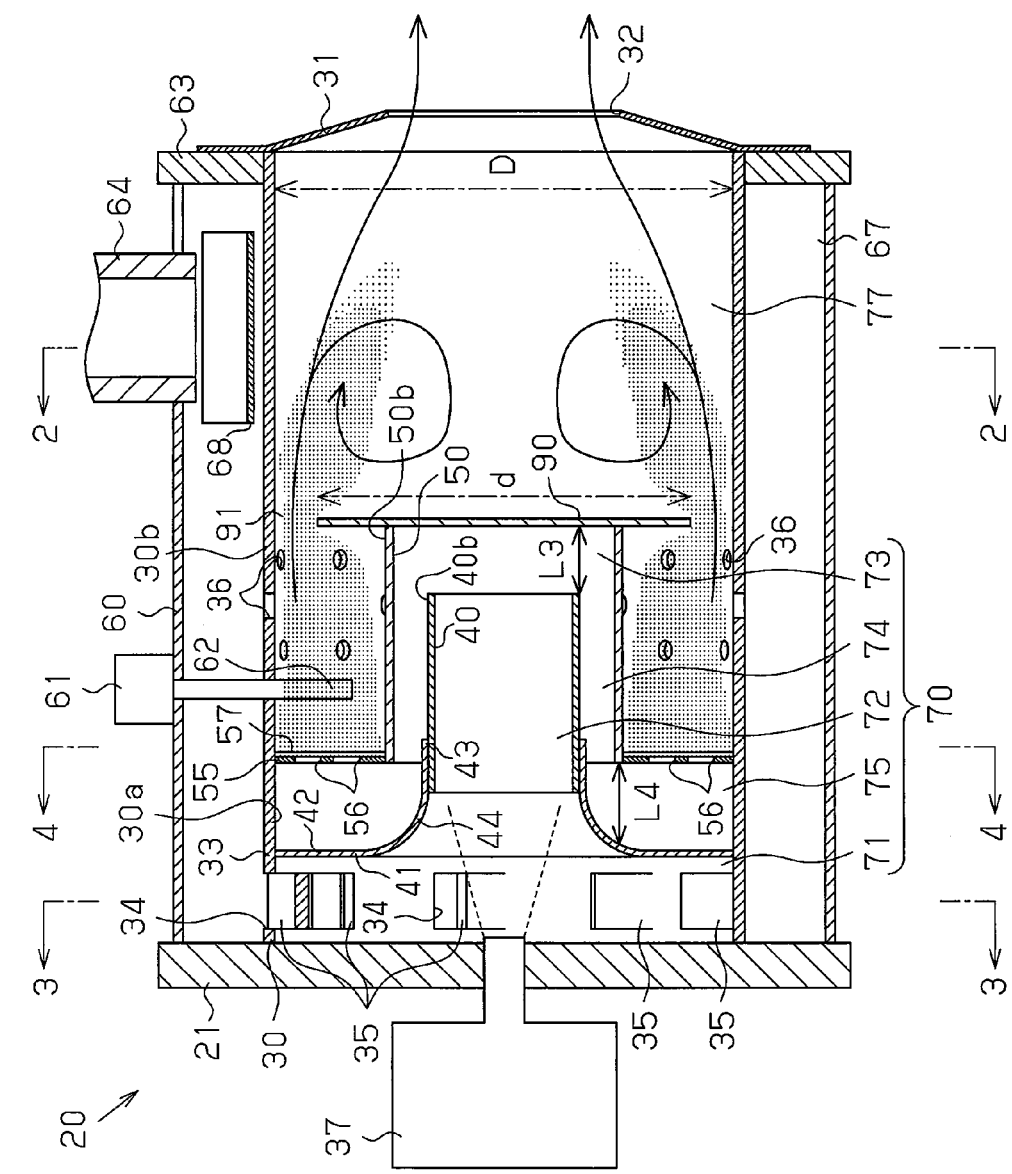
FIG. 10 is a schematic configuration diagram showing a schematic configuration of a third embodiment embodying the burner according to the present disclosure.

As shown in FIG. 10, a baffle plate 90, which is a closing portion, is joined. The baffle plate 90 closes the opening of the tube portion 50. The diameter d of the baffle plate 90 is greater than the outer diameter of the tube portion 50 and has the edge portion projecting out to the outer side of the tube portion 50. In the third embodiment, the baffle plate 90 functions as the circulating flow generating portion.

The combustion gas and the pre-mixed gaseous mixture containing the unburned fuel coexist around the igniting portion 62. The combustion gas and the pre-mixed gaseous mixture are accelerated and flow toward the back side of the baffle plate 90 through a narrow portion 91 arranged between the baffle plate 90 and the inner side surface 30a of the tube portion 30. The diffusion of the unburned fuel contained in the pre-mixed gaseous mixture is promoted since the pressure is reduced on the downstream of the narrow portion 91. The circulating flow is generated at the back side of the baffle plate 90. The circulating flow is circulated between the upstream side and the downstream side of the flow from the igniting portion 62 toward the ejection port 32, and is mixed in the up and down direction along the center axis of the tube portion 30. As a result, the term of the stagnation of the unburned fuel in the combustion chamber 77 becomes long, and the unburned fuel is taken into the flame F and easily combusted.

The ratio (d/D) of the diameter d of the baffle plate 90 with respect to the inner diameter D of the tube portion 30 influences the mixing efficiency of the unburned fuel in the combustion chamber 77 and the pressure on the upstream side of the baffle plate 82. The ratio (d/D) is preferably greater than or equal to 0.6 and smaller than or equal to 0.8 for reasons similar to the second embodiment.

After the start of combustion, the baffle plate 90 is heated by the combustion gas and the flame F. Since the baffle plate 90 is the closing plate that closes the opening of the tube portion 50, the majority of the heat absorbed from the combustion gas and the like can be propagated to the pre-mixed gaseous mixture in the second mixing chamber 72 and the third mixing chamber 73. Therefore, the liquefaction of the vaporizing fuel is suppressed and the vaporization of the liquefied fuel is promoted.

As described above, the burner 20 of the third embodiment has the following effect (advantage) in addition to the effects (advantages) described in (1) to (14) of the first embodiment and the effects (advantages) described in (15) and (18) to (20) of the second embodiment.

(21) In the third embodiment, the burner 20 includes the baffle plate 90 that closes the opening of the tube portion 50 and that projects out from the outer side surface 50b of the tube portion 50. Thus, the circulating flow is generated on the downstream side of the baffle plate 90. The baffle plate 90 also closes the opening of the tube portion 50, so that the heat is easily propagated to the pre-mixed gaseous mixture and the amount of heat loss lost before heating the pre-mixed gaseous mixture is reduced.

The second and third embodiments may be appropriately modified and implemented as below.

Figure 11:
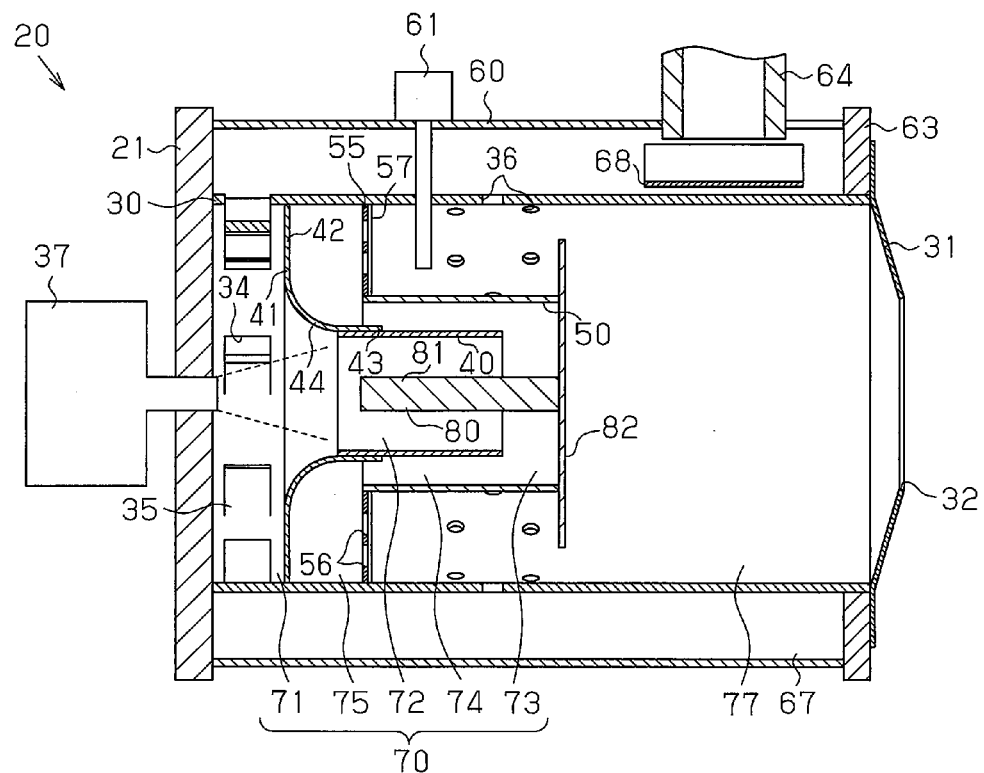
FIG. 11 is a schematic configuration diagram showing a schematic configuration of a variant of the burner according to the present disclosure.
Figure 11:
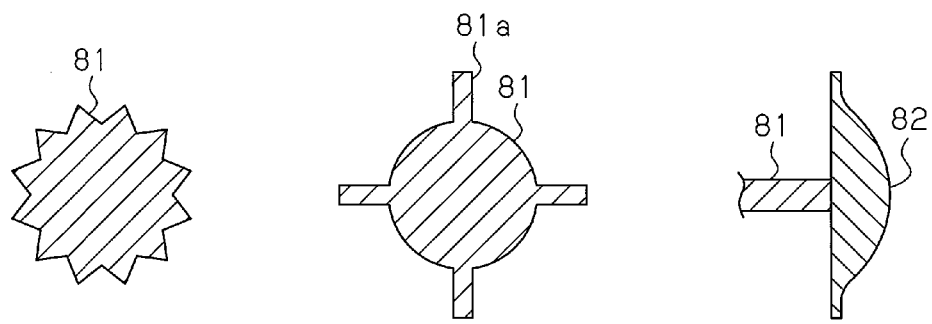

In the second embodiment, the first circulating flow generating space 83 is arranged between the baffle plate 82 of the baffle unit 80 and the closing plate 51, but may be omitted. For example, as shown in FIG. 11, a lid of the third tube portion 50 may be configured by the baffle plate 82, and the heat transmitting portion 81 may be extended from the baffle plate 82 into the third tube portion 50. In other words, the heat transmitting portion 81 arranged in the premixing chamber 70 may be coupled with the baffle plate 90 of the third embodiment.

The baffle plate of the second and third embodiments merely needs to make contact with at least the combustion gas of the combustion chamber, and may be arranged so as not to make contact with the flame F.

In the second embodiment, the heat transmitting portion 81 of the baffle unit 80 is formed to a rod shape. Other than such case, the cross-sectional shape of the heat transmitting portion 81 may be a star shape as shown in FIG. 12(a), or may be a shape in which a heat transmitting plate 41a is projected out as shown in FIG. 12(b). Accordingly, a specific surface area of the heat transmitting portion 81 can be increased.

The baffle plate 82 of the second embodiment may not be a flat plate shape, and for example, the baffle plate 82 may have a back surface arranged on the downstream side formed to a streamline shape in side view, as shown in FIG. 12(c). Thus, the gas flows along the back surface, and collides at the middle of the baffle plate 82 so that the circulating flow is easily generated. This is similar for the baffle plate 90 of the third embodiment.

In the second embodiment, the heat transmitting portion 81 of the baffle unit 80 may be fixed by other members in addition to the closing plate 51 of the third tube portion 50. For example, the distal end of the heat transmitting portion 81 may be fixed with a plate-shaped member and the like joined to the inner side of the third tube portion 50. Such plate-shaped member is formed with a through-hole for passing the pre-mixed gaseous mixture.

DESCRIPTION OF SYMBOLS

F flame
10 diesel engine
11 exhaust passage
12 diesel particulate filter
13 intake passage
14 turbine
15 compressor
20 burner
21 substrate
30 first tube portion
30a inner side surface
30b outer side surface
31 ejection plate
32 ejection port
33 extended part
34 first introduction port
35 cut-and-raised piece 36 second introduction port
37 fuel supplying unit
40 second tube portion
40b outer side surface
41 coupling wall portion
42 collar part
43 internal inserting part
44 diameter reduced part
50 third tube portion
50b outer side surface
51 closing plate
55 partition wall
56 communication path
57 metallic mesh
60 fourth tube portion
60a inner side surface
61 ignition plug
62 igniting portion
63 closing plate
64 air supplying passage
65 air valve
67 air flowing chamber
68 guiding portion
70 premixing chamber
71 first mixing chamber
72 second mixing chamber
73 third mixing chamber
74 fourth mixing chamber
75 fifth mixing chamber
77 combustion chamber
80 baffle unit
81 heat transmitting portion
82 baffle plate
83 first circulating flow generating space
84 narrow portion
85 second circulating flow generating space
90 baffle plate
91 narrow portion

The invention claimed is:

1. A burner comprising:
a first tube portion having a tube end including an ejection port that ejects a combustion gas in which gaseous mixture is combusted;
a second tube portion extending in the first tube portion toward the ejection port, the gaseous mixture flowing into the second tube portion from a side opposite to the ejection port;
a third tube portion arranged in the first tube portion, the second tube portion is internally inserted into the third tube portion, the third tube portion including a closed end closed by a closing portion that is positioned on the ejection port side;
a first wall that is coupled to an inner side surface of the first tube portion and an outer side surface of the second tube portion to close a gap between the first tube portion and the second tube portion;
a second wall coupled to the inner side surface of the first tube portion and an outer side surface of the third tube portion, the second wall having a communication path that communicates a side opposite to the ejection port with respect to the second wall with the ejection port side;

an air supplying passage for supplying air; and an igniting portion that is arranged on the ejection port side with respect to the second wall and that ignites the gaseous mixture, wherein:

the first tube portion includes an extended part extending toward the side opposite to the ejection port from a coupling portion of the first tube portion with the first wall;

the extended part defines a space that is configured to receive fuel and air;

and the extended part has first introduction ports that introduce air supplied through the air supplying passage into the extended part and swirling flow generating portions that generate a swirling flow of the air supplied through the air supplying passage in the extended part;

wherein the first tube portion includes:

second introduction ports that are positioned in a region of the ejection port side with respect to the igniting portion, wherein the second introduction ports introduce air to a gap between the first tube portion and the third tube portion.

2. The burner according to claim 1, further comprising: a fourth tube portion arranged so that the first tube portion is internally inserted, the fourth tube portion having an end on the ejection port side that closes a gap with the first tube portion and, wherein the air supplying passage that is connected to a region on the ejection port side of the fourth tube portion and that supplies air to a gap between the first tube portion and the fourth tube portion.

3. The burner according to claim 2, further comprising a guiding portion that guides the air so that the air from the air supplying passage swirls around the first tube portion.

4. The burner according to claim 1, wherein, an internal space of the first tube portion is partitioned to a premixing chamber and a combustion chamber by the third tube portion, the closing portion, and the second wall, and the closing portion includes a circulating flow generating portion having:

a surface that collides with a flow of the combustion gas from the igniting portion side toward the ejection port to generate a circulating flow in a part of the flow; and a region configured to be exposed to a pre-mixed gaseous mixture in the premixing chamber.

5. The burner according to claim 4, wherein: the closing portion includes a closing plate that closes the open end of the third tube portion; the circulating flow generating portion includes a baffle plate arranged on the ejection port side with respect to the closing plate, the combustion gas from the igniting portion side toward the ejection port colliding the baffle plate; and a first circulating flow generating space is arranged between the baffle plate and the closing plate in the combustion chamber to generate a circulating flow on an upstream side of the baffle plate, and a second circulating flow generating space is arranged on a downstream side of the baffle plate in the combustion chamber.

6. The burner according to claim 4, wherein the circulating flow generating portion includes a heat transmitting portion having an elongated shape inserted in the premixing chamber.

7. The burner according to claim 4, wherein the circulating flow generating portion includes a baffle plate that closes the open end of the third tube portion, the baffle plate having a portion that projects out from an outer side surface of the third tube portion.

8. The burner according to claim 5, wherein a narrow portion is arranged between the baffle plate and the first tube portion.

9. The burner according to claim 8, wherein an outer diameter of the baffle plate has a ratio of greater than or equal to 0.6 and smaller than or equal to 0.8 with respect to an inner diameter of the first tube portion.

10. The burner according to claim 4, wherein the swirling flow generating portions swirl the air in a direction different from a circulating direction of the combustion gas by the circulating flow generating portion.

11. The burner according to claim 7, wherein a narrow portion is arranged between the baffle plate and the first tube portion.

12. The burner according to claim 11, wherein an outer diameter of the baffle plate has a ratio of greater than or equal to 0.6 and smaller than or equal to 0.8 with respect to an inner diameter of the first tube portion.

\* \* \* \* \*